United States Patent [19]

Hanna

[11] Patent Number: 4,559,721

[45] Date of Patent: * Dec. 24, 1985

[54] TOP NOZZLE AIR DRYER WITH COUNTERBALANCED MOTOR ASSEMBLY

[76] Inventor: Daniel C. Hanna, 1133 SW. Rivington Dr., Portland, Oreg. 97201

[*] Notice: The portion of the term of this patent subsequent to Sep. 25, 2001 has been disclaimed.

[21] Appl. No.: 653,571

[22] Filed: Sep. 24, 1984

Related U.S. Application Data

[63] Continuation of Ser. No. 339,304, Jan. 1, 1982, Pat. No. 4,472,889.

[51] Int. Cl.⁴ ............................................. F26B 19/00
[52] U.S. Cl. .................................. 34/229; 34/243 C; 15/316 R; 15/405
[58] Field of Search ................ 34/243 R, 243 C, 222, 34/229; 15/302, 312 R, 316 R, 405; 134/58 R

[56] References Cited

U.S. PATENT DOCUMENTS

| | | | |
|---|---|---|---|
| 2,949,678 | 8/1960 | Anderson | 34/105 |
| 3,780,448 | 12/1973 | Kulmer | 34/229 |
| 3,903,562 | 9/1975 | Miles | 15/301 |
| 4,472,889 | 9/1984 | Hanna | 34/229 |

Primary Examiner—Larry I. Schwartz
Attorney, Agent, or Firm—Klarquist, Sparkman, Campbell, Leigh & Whinston

[57] ABSTRACT

A pivotally mounted overhead drying apparatus uses the weight of the blower motor as a counterbalance. The drying apparatus including the blower, ductwork and discharge nozzle comprises an integrated structure which can be slidably positioned lengthwise to vary the position of the pivot axis to achieve a substantially balanced condition. The drying apparatus has a self-positioning means whereby the apparatus pivotally moves to provide clearance in accordance with the profile of the upper surface of a vehicle advancing therebelow. The nozzle is adapted to discharge a high velocity airstream substantially vertically throughout the drying operation.

1 Claim, 5 Drawing Figures

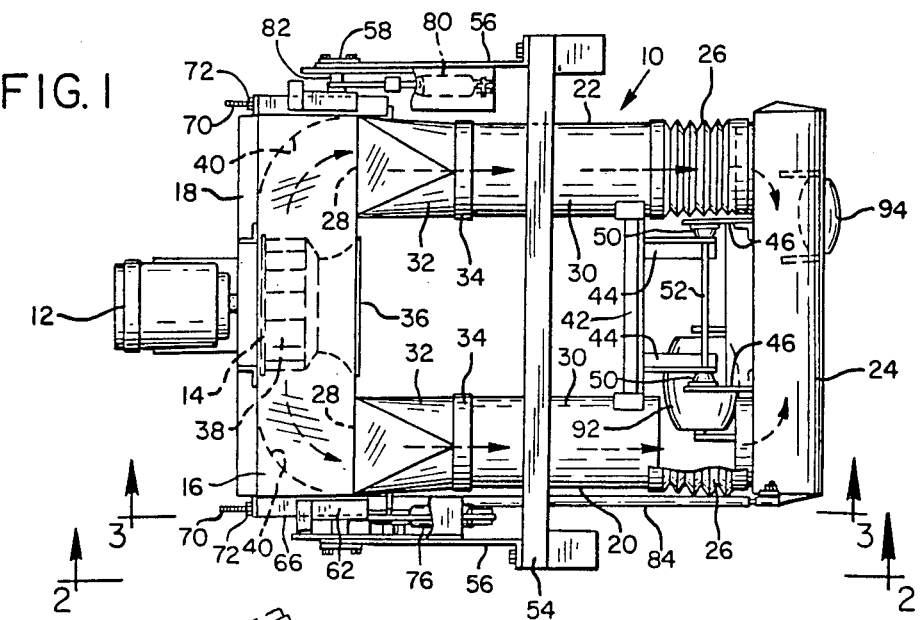
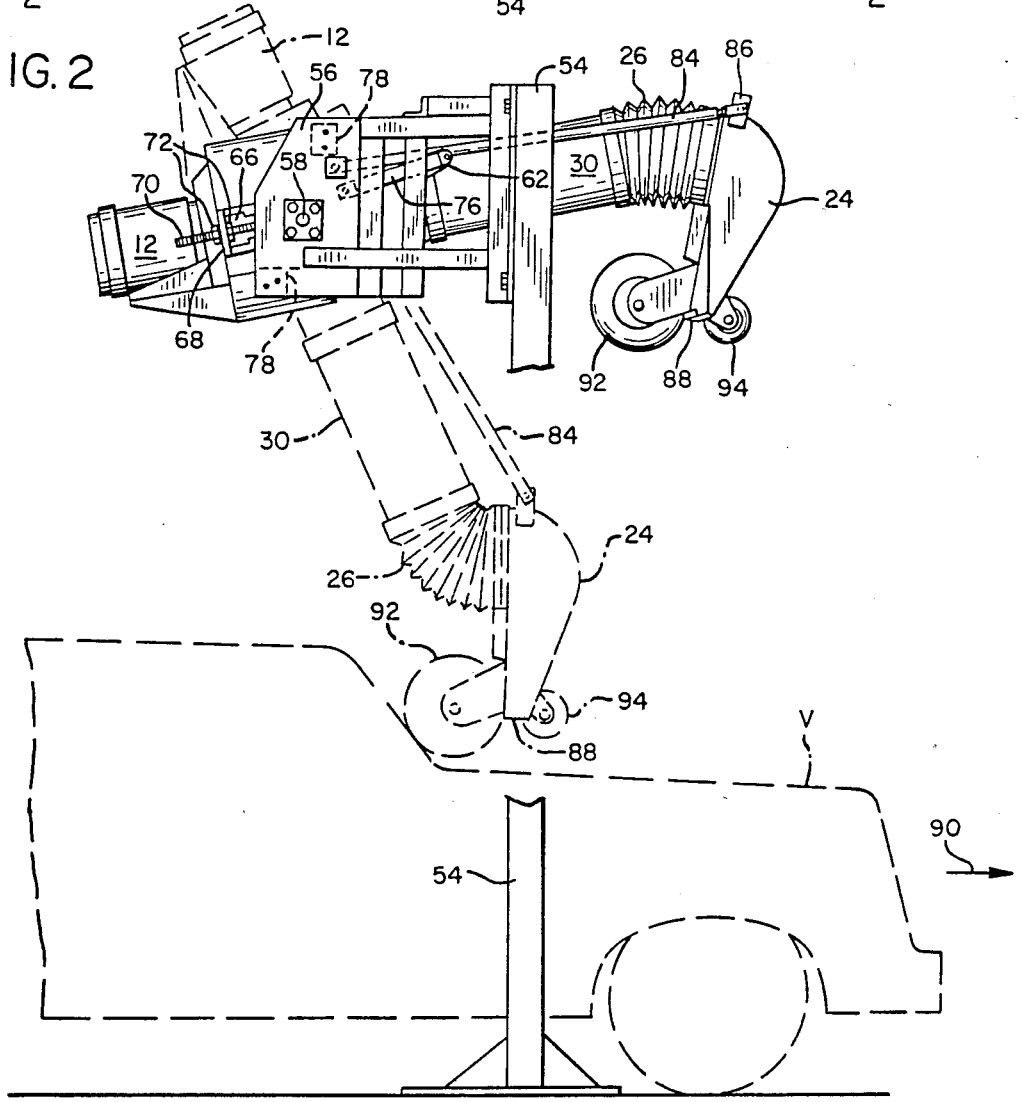

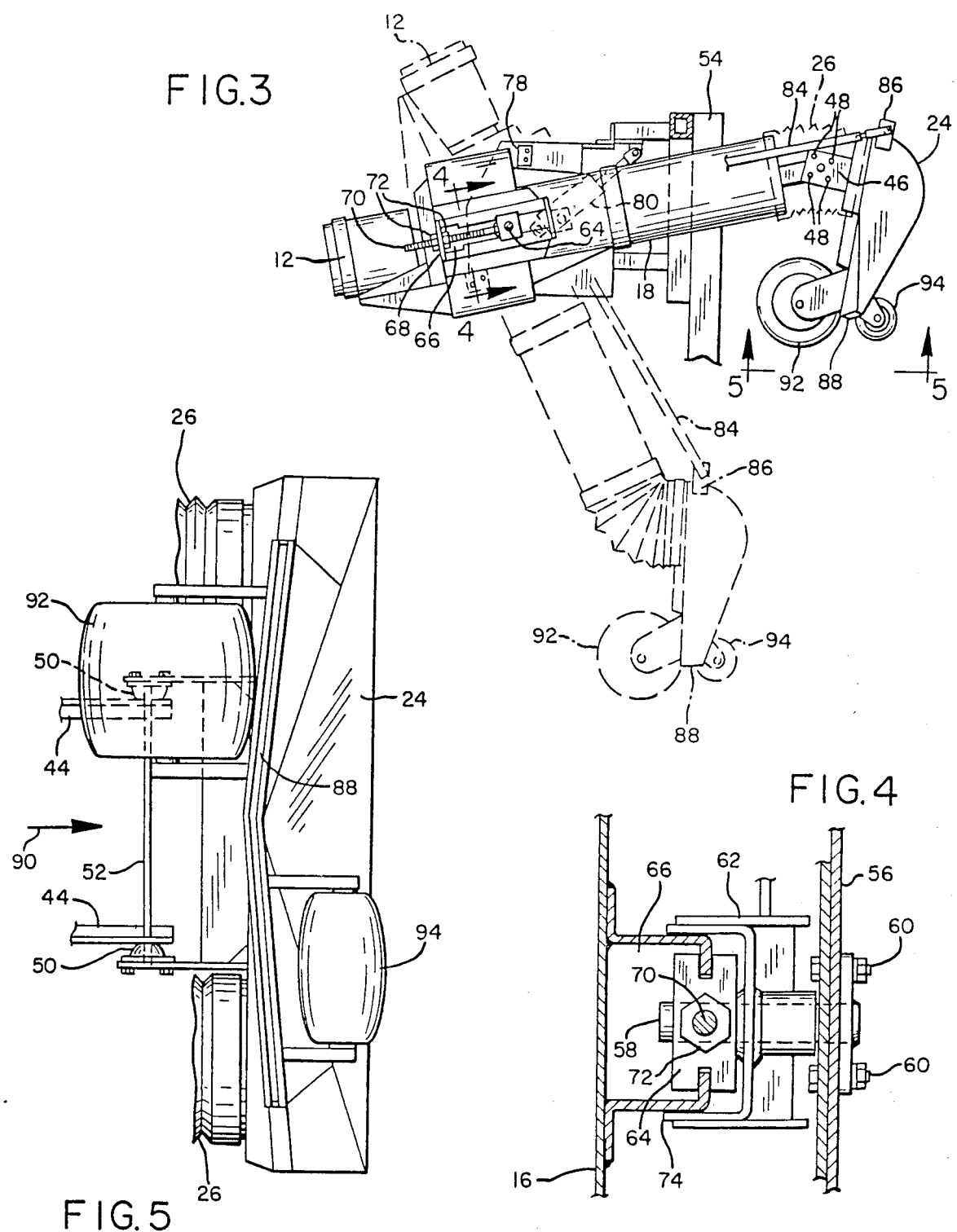

TOP NOZZLE AIR DRYER WITH COUNTERBALANCED MOTOR ASSEMBLY

This is a continuation of application Ser. No. 339,304, filed Jan. 1, 1982 now U.S. Pat. No. 4,472,889.

BACKGROUND OF THE INVENTION

1. Field of the Invention

This invention relates to means for drying freshly washed vehicles, and more particularly, to a pivotally mounted self-stabilized overhead drying apparatus having a nozzle to direct a high velocity airstream on a vehicle moving therebelow.

2. Description of Related Prior Art

It may be useful to review related prior art disclosures to ascertain the pertinent techniques for drying freshly washed vehicles. Anderson U.S. Pat. No. 2,949,678 discloses an elevated vehicle dryer having a nozzle with a self-positioning mount. The blower motor is rigidly attached to the upper portion of a stationary support structure which is situated laterally of a vehicle conveyor. The air flow from the blower is delivered by a feed duct to a right angle member which is connected through flexible duct material to an elongated duct centrally positioned over the vehicle conveyor track and terminated in a nozzle. The elongated ductwork in cooperation with the flexible duct material is pivotally mounted on an overhead structure to move about a lateral axis to maintain clearance with respect to the profile of a vehicle advancing therebelow. A counterweight mounted on the end of a boom, which is attached to and extends longitudinally of the elongated duct across the pivot axis in a direction opposite the nozzle, produces a static force to balance substantially the weight of the ductwork extending from the pivot axis to the nozzle. Balancing the rotational forces generated by the discharge of air from the blower and through the nozzle is accomplished by vertically offsetting the pivot axis relative to the aperture at the end of the elongated duct opposite the nozzle.

To dry a vehicle successfully, the Anderson invention requires a dead weight suspended over the path of a vehicle approaching the drying nozzle. Apart from the potential damage to the vehicle should the weight be dislodged and fall, the presence of a substantial weight positioned at the end of a pivotally mounted boom presents a constant danger of injury to anyone working in its vicinity.

The Anderson invention also suffers from operational disadvantages stemming from the need for extensive, elaborate ductwork to deliver a high velocity airstream from a blower situated at a substantial distance from the discharge nozzle. Lengthy ductwork having abrupt contours away from the blower aperture necessitates the use of a higher energy motor to sustain a high velocity airstream. Discharging higher velocity air, however, necessitates the use of a feed duct increased in size to eliminate back pressure, which further diminishes the velocity of air available at the orifice of the discharge nozzle.

In addition, Anderson discloses no structural means to fix the nozzle orifice to discharge air in a constant direction upon pivotal movement of the elongated duct during a drying operation.

Capra U.S. Pat. No. 3,742,615 discloses a pair of blowers pivotally mounted on an inverted U-shaped structure that moves relative to the length of the vehicle. Motion of each blower about its pivot axis is controlled by either a pneumatic or hydraulic jack which is mounted on the structure. Capra uses the jack not only to sweep the nozzle across the surface of the vehicle, but also to furnish a constant external force to stabilize the blower assembly while it remains stationary. The Capra invention, therefore, does not teach the present invention because it employs an external mechanism, which does not function as a counterweight, to stabilize a pivotally mounted blower apparatus.

Additional prior art can be classified into two general categories, neither of which teaches the present invention. The first category includes Vani U.S. Pat. No. 3,367,040, Rupp U.S. Pat. No. 3,805,410, and Peters U.S. Pat. No. 3,808,698. Each of these features an apparatus which houses an air blower assembly that remains stationary throughout the drying operation. The drying operation is accomplished by advancing the vehicle through a structure which houses extensive ductwork that directs forced air to nozzles spaced about the surface of the vehicle. Peters does show a relatively short rotatable overhead nozzle; however, the heater assembly and primary ductwork remain fixed. Because each blower assembly is rigidly secured to its support structure, none of these apparatus requires the use of a counterweight assembly of any type.

The second category includes Heinicke U.S. Pat. No. 3,375,592, Von Kulmer U.S. Pat. No. 3,780,448, and Burger U.S. Pat. No. 3,787,986. Each of these discloses an air blower apparatus securely mounted on an inverted U-shaped structure that directs forced air over the surface of the vehicle by either guiding a nozzle attached to flexible ductwork that is in contact with the vehicle as it passes through or moving the entire structure along the length of the vehicle. In contrast to the present invention which pivotally mounts the air blower assembly about an axis and utilizes an integrated internal mechanism for stability, the apparatus of this second category achieve inherent stability by keeping the air blower fixed.

Burger U.S. Pat. No. 3,787,986 shows an alternative embodiment for a small pivotally mounted blower apparatus adapted for manual handling and control. This embodiment, however, neither possesses external ductwork, which would necessitate counterbalancing, nor utilizes any internal stabilization means to balance the apparatus, a function which is incumbent in part upon the operator to accomplish.

None of the references discussed hereinabove discloses a pivotally mounted overhead drying apparatus having an internally stabilized structure to self-position the apparatus and to promote efficient drying of a freshly washed vehicle advancing therebelow. A primary object of this invention is, therefore, to accomplish this task by providing a pivotally mounted overhead drying apparatus featuring an integrated structure including a blower, ductwork and discharge nozzle which can be slidably positioned to balance substantially torque generating forces on both sides of the pivot axis without necessitating the use of an external counterweight. The drying apparatus is capable of maintaining the disposition of the nozzle orifice to discharge air in a fixed direction over the vehicle as the apparatus pivotally moves in response to the profile of the upper surface of the vehicle moving thereunder.

A further important object of this invention is to provide an overhead drying apparatus that is capable of discharging a substantial volume of air through the use of relatively short ductwork, thereby allowing the use of a low power blower.

Another important object of this invention is to provide an overhead drying apparatus capable of delivering through ductwork of relatively small cross section to a discharge nozzle a large volume of forced air having uniform flow characteristics.

Still another important object of this invention is to provide an overhead drying apparatus which is capable of using a low power blower to generate a sufficiently large concentrated airstream and which apparatus facilitates greater versatility in specifying the elevation with respect to the vehicle and directional capability of a discharge nozzle.

The overall advantage of the present invention is the capability for accomplishing safe and efficient drying of a freshly washed vehicle by means of an overhead drying apparatus comprising compact ductwork coupled to a blower having a reduced power rating.

SUMMARY OF THE INVENTION

This invention responds to the deficiencies inherent in the prior art reviewed hereinabove by providing an overhead top nozzle drying apparatus constituting an integrated structure that is pivotally mounted and capable of serving as its own counterweight.

The invention comprises a blower including a motor and impeller having an intake orifice encircled by circumferential discharge apertures for radially discharging forced air. The blower is positioned on a support structure elevated with respect to and extending across a conveyor means which advances a freshly washed vehicle relative thereto. Attached to the blower is an elongated U-shaped feed duct having an orifice centrally located in its bottom member The U-shaped duct is operatively coupled to the circumferential discharge apertures of the impeller for delivering forced air through both feed duct members that terminate in a pivotally mounted, transversely elongated nozzle. The structure comprising the blower, ductwork and nozzle constitutes a blower means or drying apparatus which is pivotally mounted on the support structure. The pivot axis extends transversely of the drying apparatus which is adapted pivotally to move to provide clearance for the nozzle in accordance with the varying contour of the upper surface of the vehicle advancing therebelow.

The blower is mounted on the support structure so it can be slidably positioned lengthwise along the ductwork of the drying apparatus to produce an adjustable moment arm to counterbalance substantially the forces that induce the blower means to rotate. In a preferred embodiment the drying apparatus is movable along the support structure to lengthen and shorten simultaneously the respective moment arms on either side of the pivot axis to achieve a balance condition. In this embodiment, the total length of the drying apparatus remains constant.

A balance condition is achieved by equalizing the static and dynamic rotational forces present on both sides of the pivot axis. Since the length of a moment arm times the component of force perpendicularly disposed thereto produces the torque or rotational force, the position of the pivot axis relative to the length of the drying apparatus is a critical parameter for accomplishing a balance condition and, therefore, specifies the lengths of the moment arms in the preferred embodiment. It is apparent from the foregoing that the pivot axis is located very near the blower, which constitutes a substantial portion of the total weight of the drying apparatus. Situating the blower at the end of the shorter moment arm permits elevation of the drying apparatus with respect to the conveyor track to accommodate tall vehicles while simultaneously allowing for ductwork of sufficient length both to produce the required torque for balancing the apparatus and to reach shorter vehicles.

The pressurized air generated by the impeller and discharged from the nozzle also produces torques requiring counterbalancing. Placement of moment arms to balance these torques is achieved by offsetting the disposition of the pivot axis along a line perpendicular to the longitudinal axis of the ductwork aperture. In practice, the pivot axis offset is used as a coarse adjustment and the desired final balance is accomplished by adjusting the distribution of weight of the drying apparatus about the pivot axis as described hereinabove. In general, it is desirable to achieve a substantially balanced condition in which the nozzle portion of the drying apparatus tips slightly downward.

During a drying operation using the present invention, the nozzle is elevated in a substantially vertical disposition and spans the width of the freshly washed vehicle. As a roller assembly attached to and extending below the nozzle gently engages the varying contour of the upper surface of the vehicle advancing therebelow, the balanced drying apparatus responds to a minimum of contact force by rotating about its pivot axis in the appropriate direction. The nozzle itself is adapted pivotally to move separately in a direction opposite to that of the drying apparatus to preserve the vertical disposition of the nozzle as it directs the forced air over the vehicle.

It is the use of the weight of the blower that affords an integrated internally stabilized structure for a drying apparatus that features increased design flexibility and efficiency. Apart from requiring a simplified mounting structure, the present invention has the advantage of employing shorter ductwork which sustains a uniform flow and higher velocity airstream. The present invention utilizes a short, small U-shaped duct that combines two high velocity airstreams in a single discharge nozzle, thereby eliminating a requirement for a large diameter feed duct which would otherwise be necessary to avert back pressure that attenuates forward air flow pressure. The higher velocity air flow delivered to the discharge orifice furnishes increased versatility in designing a nozzle structure for directing air flow patterns across the vehicle. The present invention exploits this advantage by positioning the nozzle under operating conditions at a height which is sufficient to dry a vehicle and also avoids excessive contact with the vehicle as it advances therebelow.

The foregoing and other objects, features, and advantages of the present invention will become more apparent from the following detailed description which proceeds with reference to the accompanying drawings:

BRIEF DESCRIPTION OF THE DRAWINGS

In the drawings:

FIG. 1 is a plan view, partly in section, of an overhead drying apparatus mounted on a support structure in accordance with the invention;

FIG. 2 is a side elevation view, partly in section, of the drying apparatus of FIG. 1 in its fully raised position, and which shows in dashed lines one operating position;

FIG. 3 is a vertical sectional view similar to FIG. 2, taken along line 3—3 of FIG. 1 and showing the adjustable bearing which changes the lengthwise position of the pivot axis along the drying apparatus;

FIG. 4 is a fragmentary sectional view taken along line 4—4 of FIG. 3 showing the means for slidably positioning and securing the drying apparatus to the support structure; and FIG. 5 is a bottom view of the discharge nozzle.

DETAILED DESCRIPTION

FIGS. 1 and 2 show the drying apparatus of the present invention suitably mounted on a support structure to dry a freshly washed vehicle advancing therebelow. In FIG. 1, drying apparatus 10 includes blower motor 12 operatively connected to impeller 14 which is secured to and housed in bottom member 16 of U-shaped ductwork 18. Ductwork 18 has two parallel side members 20 and 22, each of which is coupled to nozzle 24 throuqh flexible duct members 26.

Discharge outlets 28 of bottom member 16 are of generally trapezoidal shape and are connected to tubular extension pipes 30 by means of adapters 32. The circular end of each adapter 32 is secured to each extension pipe 30 by fitting ring 34 thereon. The trapezoidal end of adapter 32 is welded to bottom member 16.

Air is drawn through intake orifice 36 into impeller 14 wherein it is increased substantially in velocity and then discharged circumferentially radially through apertures 38 into duct member 16. To preserve an even flow of forced air to nozzle 24, curved baffles 40 are installed to provide a suitable interface along the outer radii between duct member 16 and side duct members 20 and 22. This particular interface is important because the high velocity airstream generated in this embodiment tends to flow along this outer surface.

As shown best in FIGS. 1 and 3, nozzle 24 is pivotally mounted to ductwork 18 to enable a substantially constant vertical disposition of the nozzle as will be hereinafter further described. Cross member 42, to which nozzle 24 is pivotally mounted, is perpendicularly disposed and welded at both ends to side duct members 20 and 22. Extending from and perpendicularly disposed to cross member 42 are two spaced apart right angle mounting brackets 44 having axially aligned bores in the upwardly extending portions for purposes as will be further described. As best shown in FIG. 3, extending from nozzle 24 are two flange members 46 situated on each side of the top portion thereof. Four bolts 48 secure bearing 50 to the inside face of each flange 46. As shown in FIG. 1, shaft 52 passes through the axially aligned bores in brackets 44 and apertures in bearings 50 to pivotally mount nozzle 24.

With reference to FIGS. 2 and 3, drying apparatus 10 is pivotally mounted on inverted U-shaped support structure 54, which remains stationary during a drying operation. Support structure 54 spans a vehicle conveyor (not shown) which advances the vehicle therebelow. Drying apparatus 10 moves about its pivot axis to maintain proper clearance in response to the profile of the upper surface of the vehicle.

The following discussion is directed in particular to the mounting structure for the side of drying apparatus 10 which includes duct member 20; the structure for mounting the other side is analogous except where otherwise noted.

With reference to FIGS. 2 and 4, secured to support structure 54 is mounting plate 56 which provides a pivotal mount for apparatus 10. Stub shaft 58 is secured to plate 56 by four bolts 60 and constitutes the pivot axis for shock absorber arm 62 and pivot bearing 64, which collectively move about the pivot axis as will be further hereinafter described.

With reference to FIGS. 3 and 4, slotted channel 66, which is welded to and extends along the length of ductwork 18, provides means both to secure bearing 64 to apparatus 10 and movably position the pivot axis along its length. Bearing 64 has notched upper and lower surfaces into which fit the outer flange members of channel 66, thereby restricting the movement of the bearing housing to a lengthwise direction. As shown in FIG. 3, bearing stop plate 68 encloses channel 66 at its end near blower 12. Pivot bearing adjustment rod 70 passes through a bore in stop plate 68 and slidably positions apparatus 10 relative to pivot bearing 64 along channel 66. Nuts 72 on either side of stop plate 68 fix bearing 64 at the desired position within channel 66. The enlarged portion at one end of channel 66 enables the installation of bearing 64 therein.

It is apparent, therefore, that when mounted to support structure 54 by journaling stub shaft 58 through bearing 64, drying apparatus 10 is pivotally mounted and may be balanced about its pivot axis by using adjustment rods 70 to re-position bearing 64 within channel 66.

With reference to FIGS. 2 and 4, interposed between bearing 64 and mounting plate 56 is shock absorber arm 62. Shock absorber arm 62 is pivotally mounted on stub shaft 58 and includes U-shaped member 74 which extends over the support structure on apparatus 10 that forms channel 66. Shock absorber arm 62 is thereby adapted to pivotally move collectively with apparatus 10. Shock absorber 76 is pivotally secured at both ends, the one end to mounting plate 56 and the other to shock absorber arm 62 as shown in FIG. 2. Shock absorber 76 dampens the response of assembly 10 upon the pivotal movement induced by contact with the vehicle. Stop brackets 78 secured to mounting plate 56 limit the travel of apparatus 10 about its pivot axis.

With reference to FIGS. 1 and 3, air cylinder 80 is situated in the corresponding location of shock absorber 76 on the opposite side of apparatus 10 and is pivotally secured to both mounting plate 56 and air cylinder lift crank assembly 82, which mounts to and pivotally moves in a manner similar to that of shock absorber arm 62. Air cylinder 80 is actuated by a signal from a probe (not shown) indicating that a large vehicle, such as a panel truck, is approaching. Upon detection of such signal, air cylinder 80 increases in length, thereby exerting a force on lift crank 82 which acts as a moment arm pivotally to move apparatus 10 to an upward position to provide sufficient clearance.

With reference to FIGS. 2 and 3, as drying apparatus 10 rotates about its pivot axis, the discharge orifice of nozzle 24 remains in a substantially constant angular disposition to provide a vertically directed air flow discharge across the surface of the vehicle. Radius rod 84 is pivotally mounted between mounting plate 56 and upwardly extending flange 86 on nozzle 24 and is rotatably adjustable to fix the desired angular disposition of the orifice relative to the surface of the vehicle. Flexible duct members 26 cooperate with radius rod 84 to sustain a constant direction of air discharge as shown. FIG. 5 shows the V-shaped pattern of orifice 88 as it directs an air flow onto the upper surface of the vehicle as it passes therebelow.

With reference to FIG. 2, the drying operation is accomplished by adjusting the pivot axis along channel 66 to orient apparatus 10 in the slightly downward position with the blower operating. As vehicle V approaches in direction 90 as shown, nozzle 24 discharges a concentrated airstream across the surface of the vehicle. Large contact roller 92 is rotatably mounted on and extends below nozzle 24. Drying apparatus 10 is nominally balanced so that nozzle 24 is elevated to engage a standard sized passenger vehicle at the windshield with large roller 92. As the vehicle advances, the contact force with roller 92 urges apparatus 10 to move about its pivot axis in a counterclockwise sense to conform to the changing profile of vehicle V. Nozzle 24 in cooperation with flexible duct member 26 simultaneously rotates about pivot shaft 52 in a clockwise sense to preserve the angular disposition of air discharge set by radius rod 84. As the vehicle advances beyond nozzle 24, small roller 94 contacts vehicle V to ensure a smooth disengagement therefrom.

Having illustrated and described what is presently the preferred embodiment of my invention, it should be apparent to those skilled in the art that the embodiment may be modified in arrangement and detail without departing from the principles of the invention which are intended to be illustrated but not limited by the disclosure. I therefore claim as my invention all such modifications as come within the true spirit and scope of the following claims.

What is claimed is:

1. In a self-balanced overhead-mounted assembly for drying a freshly washed vehicle, the improvement comprising:

a support structure;

means to advance the vehicle relative to the support structure;

an elongated blower means pivotally mounted to the support structure for movement about a pivot axis, the blower means comprising an integrated structure which includes a blower to discharge forced air, a nozzle to discharge forced air produced by the blower, the nozzle having an orifice positioned about the vehicle advancing thereunder, the pivot axis being disposed at an intermediate position between the blower and the nozzle, bifurcated duct members disposed between and in communication with the blower and the nozzle to deliver the air discharged from the blower to the nozzle, the blower being operatively connected to an impeller having a circumferential radial discharge and being positioned laterally between the duct members to provide an airstream of substantially uniform velocity to the nozzle;

a pivot mounting for the blower means, the mounting including adjustment means to provide for adjustable movement of the pivot axis relative to the length of the blower means to produce two adjustable moment arms having a substantially constant total length to substantially balance the static and dynamic forces about the pivot axis; and means to move the blower means about the pivot axis to provide clearance for the vehicle advancing therebelow.

* * * * *

UNITED STATES PATENT AND TRADEMARK OFFICE
CERTIFICATE OF CORRECTION

PATENT NO. : 4,559,721

DATED : December 24, 1985

INVENTOR(S) : Daniel C. Hanna

It is certified that error appears in the above-identified patent and that said Letters Patent is hereby corrected as shown below:

Column 5, line 17, "throuqh" should be --through--; and

Column 8, line 10, claim 1, "about" should be --above--.

Signed and Sealed this

Fourth Day of March 1986

[SEAL]

*Attest:*

DONALD J. QUIGG

*Attesting Officer*

*Commissioner of Patents and Trademarks*